United States Patent
Naimer et al.

(10) Patent No.: US 6,643,580 B1
(45) Date of Patent: Nov. 4, 2003

(54) FLIGHT PLAN INTENT ALERT SYSTEM AND METHOD

(75) Inventors: Hubert L. Naimer, Ascona (CH); Patrick G. Krohn, Issaquah, WA (US); Patrick K. Glaze, Duvall, WA (US)

(73) Assignee: Universal Avionics Systems Corporation, Tucson, AZ (US)

(*) Notice: Subject to any disclaimer, the term of this patent is extended or adjusted under 35 U.S.C. 154(b) by 0 days.

(21) Appl. No.: 09/418,709

(22) Filed: Oct. 15, 1999

Related U.S. Application Data (60) Provisional application No. 60/104,565, filed on Oct. 16, 1998.

(51) Int. Cl.[7] ............................................. G08B 23/00
(52) U.S. Cl. ............................. 701/206; 701/9; 701/14; 701/200; 244/1 R; 340/963
(58) Field of Search ............................. 701/206, 9, 14, 701/16, 36, 200; 244/1 R; 340/963, 945

(56) References Cited

U.S. PATENT DOCUMENTS

| | | | |
|---|---|---|---|
| 3,206,745 A | 9/1965 | Waters | 343/5 |
| 3,209,353 A | 9/1965 | Wiener et al. | 343/7 |
| 3,210,760 A | 10/1965 | Olson et al. | 343/7 |
| 3,302,198 A | 1/1967 | Selvin et al. | 343/7 |
| 3,533,105 A | 10/1970 | Sharp | 343/7 |
| 3,715,718 A | 2/1973 | Astengo | 340/27 |
| 3,922,637 A | 11/1975 | Bateman | 340/27 |
| 3,925,751 A | 12/1975 | Bateman et al. | 340/27 |
| 3,934,221 A | 1/1976 | Bateman et al. | 340/27 |
| 3,934,222 A | 1/1976 | Bateman et al. | 340/27 |
| 3,936,796 A | 2/1976 | Bateman | 340/27 |
| 3,936,798 A | 2/1976 | Haerther et al. | 340/27 |
| 3,944,968 A | 3/1976 | Bateman et al. | 340/27 |

(List continued on next page.)

FOREIGN PATENT DOCUMENTS

| | | |
|---|---|---|
| EP | 0 565 399 A1 | 10/1993 |
| EP | 0 750 238 A1 | 12/1996 |
| EP | 0 802 469 A1 | 10/1997 |
| EP | EP0802469 | 10/1997 |
| EP | 0 826 946 A1 | 3/1998 |
| EP | 0 829 823 A2 | 3/1998 |
| FR | 2607948 A1 | 6/1988 |
| WO | WO 8800734 | 1/1988 |
| WO | WO 8800748 | 1/1988 |
| WO | WO 8800749 | 1/1988 |
| WO | WO 8808182 | 10/1988 |
| WO | 9 221 077 | 11/1992 |

OTHER PUBLICATIONS

Wendl, M. J., et al., "Advanced Automatic Terrain Following/Terrain Avoidance Control Concepts Study", IEEE, 1982.

Gorder, Peter J., et al., "Obstacle Detection and Avoidance Maneuver Selection for Automatically Guided Rotorcraft Nap–Of–The–Earth Flight Following Planned Flight Profiles", IEEE, 1989.

*Primary Examiner*—William A. Cuchlinski, Jr.
*Assistant Examiner*—Olga Hernandez
(74) *Attorney, Agent, or Firm*—Greenberg Traurig LLP

(57) ABSTRACT

Flight plan information is provided in the form of a series of waypoints having attributes which preferably include, among others, latitude, longitude, altitude constraint, and waypoint identifier. A flight path, defined by this information is modeled, and the flight plan model is checked against terrain information to locate any instances in which a potentially unsafe flight altitude exists. In flight, the flight path model is updated using aircraft position so that the path from the aircraft position to the next waypoint is reflected in the model. In the event that a potentially unsafe flight altitude is detected, an alert may be issued to the flight crew. The crew may then amend the flight plan or take other appropriate action.

56 Claims, 3 Drawing Sheets

U.S. PATENT DOCUMENTS

| | | | |
|---|---|---|---|
| 3,946,358 A | 3/1976 | Bateman | 340/27 |
| 3,947,808 A | 3/1976 | Bateman | 340/27 |
| 3,947,809 A | 3/1976 | Bateman | 340/27 |
| 3,947,810 A | 3/1976 | Bateman et al. | 340/27 |
| 3,958,218 A | 5/1976 | Bateman | 340/27 |
| 3,958,219 A | 5/1976 | Bateman et al. | 340/27 |
| 3,988,713 A | 10/1976 | Bateman | 340/27 |
| 4,016,565 A | 4/1977 | Walker | 343/7 |
| 4,030,065 A | 6/1977 | Bateman | 340/27 |
| 4,060,793 A | 11/1977 | Bateman | 340/27 |
| 4,093,938 A | 6/1978 | Argentieri et al. | 340/27 |
| 4,121,287 A | 10/1978 | Leal et al. | 364/461 |
| 4,135,143 A | 1/1979 | Argentieri et al. | 340/27 |
| 4,189,777 A | 2/1980 | Kuntman | 364/433 |
| 4,215,334 A | 7/1980 | Bateman | 340/27 |
| 4,224,669 A | 9/1980 | Brame | 364/433 |
| 4,319,218 A | 3/1982 | Bateman | 340/27 |
| 4,433,323 A | 2/1984 | Grove | 340/970 |
| 4,495,483 A | 1/1985 | Bateman | 340/970 |
| 4,551,723 A | 11/1985 | Paterson | 340/946 |
| 4,567,483 A | 1/1986 | Bateman et al. | 340/970 |
| 4,642,775 A * | 2/1987 | Cline et al. | 701/200 |
| 4,646,244 A | 2/1987 | Bateman et al. | 364/461 |
| 4,675,823 A | 6/1987 | Noland | 364/460 |
| 4,684,948 A | 8/1987 | Bateman | 340/970 |
| 4,829,304 A | 5/1989 | Baird | 342/63 |
| 4,857,923 A | 8/1989 | Bateman | 340/970 |
| 4,914,436 A | 4/1990 | Bateman et al. | 340/970 |
| 4,939,513 A | 7/1990 | Paterson et al. | 340/970 |
| 4,951,047 A | 8/1990 | Paterson et al. | 340/970 |
| 4,987,413 A | 1/1991 | Grove | 340/970 |
| 5,038,141 A | 8/1991 | Grove | 340/970 |
| 5,166,682 A | 11/1992 | Bateman | 340/970 |
| 5,196,847 A | 3/1993 | Bateman | 340/970 |
| 5,220,322 A | 6/1993 | Bateman et al. | 340/970 |
| 5,260,702 A | 11/1993 | Thompson | 340/970 |
| 5,272,639 A | 12/1993 | McGuffin | 364/449 |
| 5,410,317 A | 4/1995 | Ostrom et al. | 342/65 |
| 5,414,631 A | 5/1995 | Denoize et al. | 364/461 |
| 5,428,354 A | 6/1995 | Torget | 340/963 |
| 5,442,556 A | 8/1995 | Boyes et al. | 364/433 |
| 5,488,563 A | 1/1996 | Chazelle et al. | 364/461 |
| 5,555,175 A | 9/1996 | D'orso | 364/433 |
| 5,608,392 A | 3/1997 | Faivre et al. | 340/967 |
| 5,638,282 A | 6/1997 | Chazelle et al. | 364/461 |
| 5,646,854 A * | 7/1997 | Bevan | 701/206 |
| 5,661,486 A | 8/1997 | Faivre et al. | 342/33 |
| 5,677,842 A | 10/1997 | Denoize et al. | 364/461 |
| 5,695,157 A | 12/1997 | Coirier et al. | 244/183 |
| 5,797,106 A * | 8/1998 | Murray et al. | 701/11 |
| 5,884,219 A * | 3/1999 | Curtwright et al. | 701/213 |
| 5,933,099 A * | 8/1999 | Mahon | 340/961 |
| 5,995,903 A * | 11/1999 | Smith et al. | 701/211 |
| 6,043,757 A * | 3/2000 | Patrick | 340/963 |
| 6,088,634 A * | 7/2000 | Muller et al. | 701/9 |
| 6,092,009 A * | 7/2000 | Glover | 701/14 |
| 6,014,914 A * | 8/2000 | Wright et al. | 455/66 |
| 6,112,141 A * | 8/2000 | Briffe et al. | 701/14 |
| 6,122,572 A * | 9/2000 | Yavnai | 701/23 |
| 6,131,065 A * | 10/2000 | Marszalek | 701/120 |
| 6,173,159 B1 * | 1/2001 | Wright et al. | 455/66 |
| 6,181,987 B1 | 1/2001 | Deker et al. | 701/3 |
| 6,199,015 B1 * | 3/2001 | Curtwright et al. | 701/213 |

* cited by examiner

FLIGHT PLAN INTENT ALERT SYSTEM AND METHOD

This application claims of benefit of Provisional Application Ser. No. 60/164,565 filed Oct. 16, 1998.

BACKGROUND OF THE INVENTION

This invention relates to a method and system or using flight plan information to produce a model and then evaluating the modeled airplane flight path in view of terrain information to produce an alert for portions of the flight path model in which potentially inadequate ground clearance may occur.

Current flight management systems accept flight plan information and use this information in the piloting of aircraft. Many such systems are capable of outputting this information in digital form for use by other flight instruments. Various interface and data format standards for the transmission of such digital information have been developed and implemented. One such form of digital communication is the unidirectional communication via a wire pair data bus according to the ARINC 429 interface standard. The flight management system may have two or more such interfaces with one dedicated to data output and another to data input. Another such standard is ARINC 629, which allows higher speed, bi-directional data transmission across a bus. Data can be transmitted through such an interface in serial form in accordance with the ARINC 702 or proposed 702(a) or other standard. Under the ARINC 702 standard, for example, data is transmitted in 32 bit units. The first eight bits of the unit are the label, identifying the type of data. Flight plan information sent over the data bus may be read by any equipment interfaced to the bus, and the information contained in the latter 24 bits of the unit may be identified as to type by the eight bit label. The construction and operation of such interfaces and the transmission of such data according to protocols such as ARINC 702 are known in the art. It is also within the ability of those skilled in the art to buffer such data, translate data between different data protocols and so forth.

Current flight management systems presently include a screen, and properly labeled data transmitted to such flight management systems can frequently be displayed on such screens. In addition, the flight instrumentation may include other screens that can be sent data over a data bus, or which can be switched to receive text data, images or image overlays. Interfacing an instrument to such other screens is within the ability of those skilled in the art of the design of aircraft instrumentation. One such screen on which a flight instrument may display information may be a weather radar screen. It is known to provide switching capability to disable the sending of video signals or data from a weather radar to the weather radar screen and allow the display of video signals from such other instrument on the weather radar screen in lieu thereof. Likewise, some aircraft include multipurpose displays on which text and/or images from an instrument may be displayed, and the interfacing of instruments to such displays and their associated electronics is known in the art.

Finally, the provision of text, image, indicator light, tone, synthesized or digitized voice annunciation in response to determination of conditions requiring an alert, caution or warning are known in the art.

The flight plan information for a flight between two airports may be entered into the flight management system or other avionics in many forms, but commonly is represented by a series of flight waypoints with the initial waypoint being the departure airport and the final waypoint being the destination airport. The direct path to a waypoint is a leg, and taken together, the legs define the intended flight plan of the aircraft. Some current and planned flight management systems are capable of receiving the input of and storing about 99 waypoints. The waypoints represent a series of locations along the flight plan, and other information such as altitude constraint and waypoint identifier may be associated with specific waypoints. The flight plan information may also include required navigation performance or flight phase information.

The altitude constraint information may be an actual altitude or a qualified altitude. Qualifiers to altitude data would be at or above, above, at or below and below. For example, an at or above 8,000 feet altitude constraint would indicate the intent that the aircraft be at an altitude at the waypoint which was no less than 8,000 feet.

The waypoint identifier is a letter designation of up to five letters associated with a specific location. For example, the identifier for an approach waypoint into Seattle ANVIL. The waypoint identifier may represent the location of an airfield, radio navigation aid or other selected location. Many such waypoints are identified by such identifiers on air navigation charts. While the flight crew could enter the flight plan information by keying in the latitude, longitude and other information on the keypad of the flight management system or other device, it is frequently more convenient and less likely to cause error to allow entry of the waypoint by keying in the identifier.

Required navigation performance data, which could be provided by a flight management system as part of the flight plan information, would indicate the maximum allowable deviation from the flight path. This data may be represented by the minimum allowable deviation from a point along the flight plan which is allowed. Deviation from the flight path may occur due to a variety of factors including the lack of exact aircraft position information. Such deviation may result, for example, from drift in an inertial navigation system, limitations in the precision of a global positioning system, or from other instrument accuracy or aircraft operation factors. The required navigational performance may vary depending on aircraft flight parameters. For example, the aircraft must be flown with enhanced positional precision and may be allowed to approach terrain more closely both laterally and vertically during a landing approach than may be appropriate during the end route phase of the flight.

In addition to or in lieu of required navigation performance data, a flight management system may also provide flight phase information in conjunction with the other flight plan information. Although many different categories of flight phase information could be provided, three categories for flight phase are the approach/departure phase, which may generally be defined as within six miles of the approach or departure airport, the terminal phase, which would be the area outside the approach departure phase area but within fifteen miles of the airport, and the end route phase, which would apply to the portions of the flight outside the approach/departure and terminal areas.

While errors in the entry of flight plan information are not common, they are known to occur. Confusion between waypoint identifiers, miskeying of information, such as pressing the "0" key too few times, resulting, for example, in the entering of an altitude constraint of 2000 feet rather than 20,000 feet, or misreading latitude and longitude figures from a chart may result in a flight path that could, and have, contributed to a subsequent controlled flight into terrain. Unfortunately, it is not practical for flight crew members to attempt to check the flight path manually. This might require the plotting of the intended flight path on a map with contour information and then examining the contour information along the entire flight path. Moreover, deviations from the intended flight plan often occur during the flight. Such changes would require further plotting and checking of maps and contour information while end route.

Present and proposed ground proximity warning systems and terrain avoidance warning systems use a variety of flight configuration, position, altitude, velocity and other information to detect and warn of dangerous flight situations. Some such systems may include terrain data, including terrain models, and may use such models, for example, in the terminal area, to define altitudes below which an aircraft in a given configuration should not descend. Such systems, however, do not provide pre-checking of the intended flight path as determined from the flight plan information in order to provide an advanced warning which would allow for correction or modification of flight plan data. Rather, the violations of selected flight performance criteria result in an alert only as the terrain is being approached.

Terrain data is presently available for much of the surface of the earth. Typically, such data is presented as a grid or series of grids with grid elements representing areas of, at maximum, 30 arc seconds (30") of longitude by 30" of latitude. At the equator, 30" of longitude and 307 of latitude represent an approximate square of 3038 feet, or about one half nautical mile (0.5 nm), on a side. As you approach either the north or south pole, of course, 30" of longitude continues to correspond to 3038 feet or about 0.5 nm, but at 45° latitude, 30" of latitude represents only about 2148 feet. Thus, a grid element at this latitude would be generally rectangular.

For certain regions, the terrain data is provided in an enhanced resolution form. For example, within 15 nm of selected airports, the grid elements are provided at a resolution of 15", corresponding to approximately 0.25 nm of longitude. Within 6 nm of selected airports, moreover, resolutions of 6" or about 0.10 nm of longitude are provided. As with the 30" data mentioned above, of course, the exact dimensions of the 15" and 6" grid elements varies according to the latitude.

The data for each grid element is representative of the longitude and latitude of the center of the grid and of the maximum terrain altitude within the grid. The number of arc seconds of resolution of the grid elements is identified in conjunction with the grid, so the location of the corners of the grid could be calculated from the center point. The data is not provided with any indication of the location of the highest point of the terrain within a grid element. Altitude data is generally accurate to within about 30".

SUMMARY OF THE INVENTION

The present invention provides a method and system for receiving output signals from a flight management system and other flight instrumentation and using terrain data to identify flight path intent alert conditions. The terrain data may be in the form of grid elements as described above. However, other methods of representing terrain data could be used within the scope of the invention. Such methods may include topological descriptions of the surface of the earth as a series of contiguous triangles or other planar geometric members or as a mathematical model. It is only necessary for purposes of the present invention that terrain data be available for determining the altitude of terrain at a plurality of locations along a flight path with a known resolution.

In the present invention, a flight path intent alert system is provided which uses flight plan information obtained from the flight management system or otherwise. To the extent that the flight plan data permits, the flight plan data is used to generate an intended flight path. The intended flight path generally corresponds to a direct flight from the longitude, latitude and altitude of the first or current waypoint of a leg to the latitude, longitude and altitude of the next waypoint.

On the ground, the flight path may be modeled using the airport as the current waypoint and continuing to the last of the entered waypoints. In the air, the aircraft location and altitude, as obtained from the flight management system or other instrumentation interfaced to the flight path intent alert system may be used as the current waypoint, and the flight path may be modeled as extending directly to the next waypoint in the series of waypoints. A determination of whether the aircraft is on the ground or in the air may be made by any of a number of methods, including the use of a threshold airspeed above which the aircraft will be presumed in flight or the existence of pressure above a minimum pressure on a load cell associated with the landing gear of the aircraft, such higher pressure indicating that the aircraft is on the ground, and a lower pressure or the absence of pressure indicating that the aircraft is in flight.

If the aircraft is on the ground, the presence of flight path intent alert conditions is determined for all of the legs of the flight path for which sufficient data is available and the nearest alert annunciated, and the flight path intent alert status will remain static until an indication is received that the aircraft is in the air or until the flight plan information is modified. Once the aircraft is airborne, the aircraft position and altitude will serve as the current waypoint for flight plan leg which is actually being flown.

Before takeoff or during the flight, the flight plan information may be modified by the flight crew. If this occurs, the flight path intent alert system must recognize such modification and check again for flight path intent alert conditions. Such modifications may eliminate existing alert conditions or create new alert conditions.

If required navigational performance data is present, such data can be used to provide a horizontal tolerance around the intended flight path. If the terrain data for positions falling along the flight path or within the horizontal tolerance to either side of the flight path indicates an altitude that is greater than or equal to the altitude of the aircraft at that point along the flight path, an alert condition will be determined to exist. A vertical tolerance may also be provided and may be used to provide a determination of an alert condition if the terrain altitude comes to within or exceeds the altitude of the aircraft at a point along the flight path or within the horizontal tolerance to either side of the flight path.

If required navigational performance data is absent, but flight phase data is present in the flight plan information, this information may be used to calculate a horizontal and, possibly, vertical tolerance for the flight path. Tighter tolerances could be provided for approach/departure flight phases, somewhat broader tolerances could be used for the terminal flight phase and the tolerances could be further broadened for flight in an en route flight phase. The tolerances corresponding to each flight phase may be predetermined and stored in the flight path intent alert system in a table or otherwise.

In the event that neither required navigational performance data nor flight phase data is available, a default horizontal and possibly vertical tolerance could be provided. Such tolerance may be a predetermined single value, or could be a set of predetermined values from which the tolerance or tolerances would be chosen, for example, based on parameters such as altitude, airspeed or the like or combinations thereof, or could be calculated dynamically based on a formula.

Where the terrain data is represented as discussed above as a grid with grid elements of an indicated number of arc seconds of longitude and latitude, one half of such dimensions may be used as an increment value and the terrain data may be examined for the latitude, longitude and altitude corresponding to that of the intended flight path at discrete points therealong as defined by latitude, longitude and altitude. The altitude may advantageously be determined from the distance between two waypoints, the altitude constraint for each such waypoint and the length of an increment. If there are 100 increments between the two waypoints, and if the second of the two waypoints has an altitude constraint 5000 feet greater than that of the first of the two waypoints, and if the location being considered is at a distance of 20 increments from the first of the waypoints, then the altitude that may be used for the position of the $20^{th}$ increment along the intended flight path could be taken as the altitude constraint associated with the first waypoint increased by 20 increments multiplied by 50 feet per increment (5000 feet divided by 100 increments), or 1000 feet. Flight plan intent alert conditions may be determined for each such point and for points to either side thereof out to the lateral tolerances. These points may likewise be spaced apart by not more than a distance equal to half the resolution of the terrain data out to the horizontal tolerance.

Some flight plan data may be insufficiently detailed to permit its use as an altitude. The altitude component of 8000 feet associated with an altitude constraint of "above 8000 feet" may safely be used, as flight above this level merely provides more terrain clearance than might be expected by using an altitude of 8000 feet. An altitude constraint that is given in the form of "at or below" or "below" a specific altitude cannot be used for determining the intended altitude of the aircraft at that location because there is no indication as to how much below such altitude the pilot may intend to fly. In such case, the waypoint should be considered not to have an associated altitude constraint. Similarly, there may be no altitude constraint associated with a waypoint. In such case, it may not be possible to model the flight path for a leg accurately. In such case, use of the terrain data along the leg to such waypoint to calculate flight path intent alerts may be omitted. However, during flight, once such waypoint is reached, if the next waypoint has a useable altitude constraint, the present position and altitude of the aircraft may be used as the current waypoint of the leg, and the determination of the existence of flight plan intent alert conditions may be made for the leg between the aircraft's position and that waypoint.

A variety of methods may be used to provide flight path intent alerts to the flight crew. When a flight path intent alert condition is determined, a text alert could be generated on the flight management system screen, if it is so addressable. Likewise, if the flight path intent alert system is interfaced to a multipurpose display or weather radar display such that it can display images and/or text, an alert could be generated on such displays. Alerts could also be provided by a variety of known means, such as by having a light, tone or voice alert generated in manners known in the art.

One form of advantageous method of displaying flight path intent alerts would be via visual presentation of the flight path with associated displays of information and flight path intent alert graphics. One two dimensional representation of the flight path would be a side view, with the waypoints with useable altitude constraints represented as a series of points or vertical lines indicative by their position from the bottom of the screen, for points, or the extent to which they extend upward from the bottom of the screen, of the altitude constraint at the waypoint. Each leg for which current and next waypoint have useable altitude constraint data might be represented as a line drawn between the points or tops of the lines representative of the waypoints. An alert graphic and/or message could be displayed at any points along such lines at which a flight plan intent alert condition was detected. Lines representative of the intended flight plan would not be extended from or to waypoints for which useable altitude constraint information is not available. Terrain altitude could be indicated across the screen by vertical lines representative of the maximum altitude determined for locations along the flight path and within the horizontal tolerance around it, thus presenting a representation of an approximation of the terrain over which the airplane passes. Alternatively, a curve representative of terrain altitude versus flight plan position could be drawn across the screen and the area under the curve could be filled with a color representative of terrain. The alert graphics would thus be supplemented by a general indication of terrain clearance or lack thereof under the intended flight plan.

An overhead view or perspective view could likewise be presented. For these views, the terrain contour could be represented by shading or color, changes, and the intended flight path, again with missing segments where useable altitude constraints are absent, could be presented. Flight path intent alert graphics could be used to identify locations along the intended flight path at which alert conditions were determined to exist. For any of the displays, scrolling could be provided so that the flight crew could examine the entire intended flight path without the necessity of scaling the entire intended flight path to fit on the display at one time.

DETAILED DESCRIPTION OF THE PREFERRED EMBODIMENT

The flight plan intent alert system may be a part of, and the flight path intent alert method of the present invention may be practiced as a part of a flight management system, a ground proximity warning system or terrain avoidance warning system, or as a separate system or part of a separate system. The logic for implementing the flight plan intent alert system may be implemented in a special purpose device, or may be in the form of a stored program executable by a general purpose or special purpose computer. Preferably, the flight plan intent alert system is configured as a special purpose computer system which is separate from the flight management system, but which is connected to the flight management system to provide bi-directional data transfer between the two systems. In addition to its flight path intent alert function, the flight path intent alert system may be integrated with systems that perform additional functions, such as terrain avoidance warnings.

Figure 1:
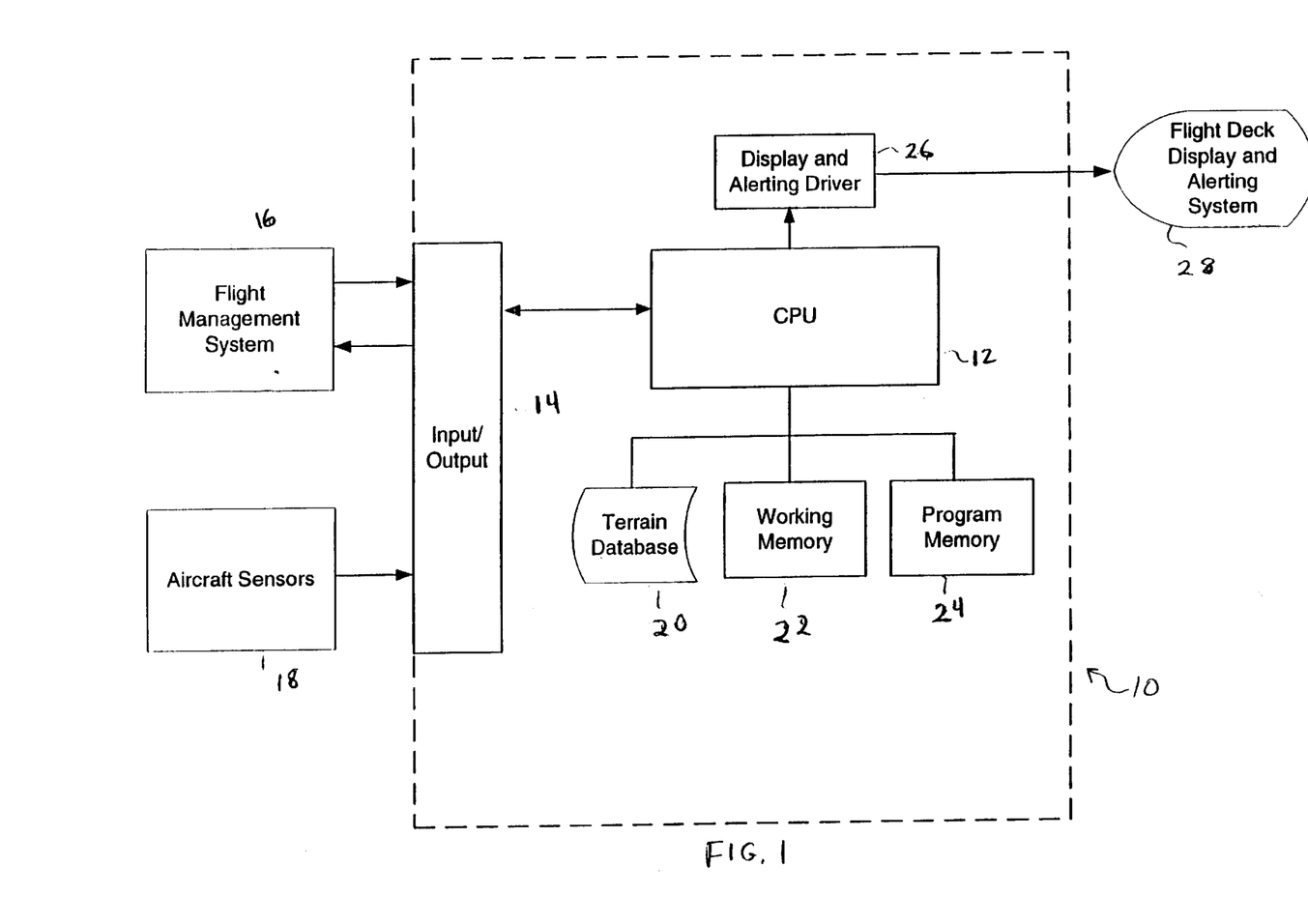
FIG. 1 is a block diagram of a eight path intent alert system.

As shown in FIG. 1, the flight plan intent alert system 10 of the preferred embodiment includes a central processing unit (CPU) 12 which may comprise a microprocessor such as a PowerPC™ microprocessor manufactured by International Business Machines Corporation. The CPU 12 of the system 10 may also comprise associated support circuitry as is known in the art. The CPU 12 is operatively connected to input/output circuitry 14 for sending and receiving digital signals from a flight management system 16 and aircraft sensors 18 such as airspeed sensors, altitude sensors, load sensors, position sensors and so forth. Interface circuitry conforming to the ARINC 429 standard, which is well known in the avionics industry, may be advantageously used for this purpose, and the input/output circuitry 14 may receive data from and transmit data to the flight management system 16 and aircraft sensors 18 using a data format such as that specified in the ARINC 702 standard or the like.

The CPU 12 is also operatively associated with memory systems, including a terrain database memory system 20, random access working memory 22 and program memory 24. The CPU is configured to load such of the contents of the terrain database memory 20 and program memory 24 into the working memory as is required and to execute the programs loaded from program memory into the working memory. Alternatively, the program memory 24 may be configured such that direct execution of a stored program from the program memory 24 by the CPU 12 is possible using working memory 22 as needed for the storage and retrieval of data as required.

The CPU is operatively connected to the display and alerting driver circuitry 26 which, in turn, is configured to transmit data to the flight deck display and alerting system. This may include any and all of flight deck alert, caution or warning lights, video displays whether dedicated to the flight plan intent alert system or provided for use by or shared use by other aircraft systems, such as general purpose displays, weather radar displays or other displays. If a weather radar display is configured to receive an RGB video signal or the like, it is known that a relay may be used to toggle the display between display of weather radar video input and input from a device such as the present system. It is also known that displays such as a multi-purpose display may be interfaced to a device such as the present system for the display of text and graphics generated by a system such as the present system. Likewise, tonal or voice (digitized or synthesized) audio outputs may be provided as part of the flight deck display and alerting system 28.

Although flight plan information may be obtained from many sources, in the preferred embodiment, flight plan information is obtained from the flight management system 16. Preferably, this data is presented in association with a series of waypoints. Labeled data units consisting of an eight bit label and 24 bits of data may be transmitted by a flight management system 16 to other instruments, including the present flight plan intent alert system 10 in the manner described in the ARINC 429 and 702 standards. The flight path data is typically transmitted in a block of such data units, each such data unit including a label indicating that the remaining data is flight plan data. Other types of data may be transmitted with different labels.

Preferably, the data provided by the flight management system includes the latitude and longitude of each waypoint along the intended flight path, and, as applicable, five character waypoint identifier, which identifiers are commonly used for specific waypoints such as airfields, radio navigation aids, points along air corridors and the like, and which appear on aviation charts. The flight management system may also provide altitude constraints in conjunction with waypoints. For any given altitude, various different altitude constraints may be provided. Using the altitude of 8000 feet as an example, altitude constraints may include above 8000 feet, at or above 8000 feet, 8000 feet, at or below 8000 feet and below 8000 feet. The first three types of constraints provide useable altitude information for purposes of the present method and system. An altitude of 8000 feet, for example, may be assigned to any waypoint for which an "above," "at or above" or simple 8000 feet altitude constraint is provided by considering the altitude component of the flight plan to be 8000 feet in each case. The latter two types of altitude constraint, namely, "below" and "at or below" do not by themselves provide useful data, as the altitude range they cover may include altitudes at or below the surface of the terrain.

Another type of data which is transmitted by the flight management system of the preferred embodiment is required navigation performance data. This data may be advantageously represented by a horizontal distance value representing the maximum allowable horizontal deviation of the aircraft from the intended flight path. The data may also include a maximum allowable vertical deviation distance value. Flight phase data may be used to provide similar information. Although many flight phases may be defined, preferably flight phase data for an approach/departure phase, where the aircraft is within, for example, 15 nm of an airport, a terminal phase, where the aircraft is within, for example 30 nm of an airport, and hence is in the terminal area, and an en route phase, for which the aircraft is beyond 30 nm from the airport.

Typically, and in the preferred embodiment, flight management systems output flight plan data and other such data at a frequency of ten or more times per second regardless of whether there has been any change to the data.

Figure 2:
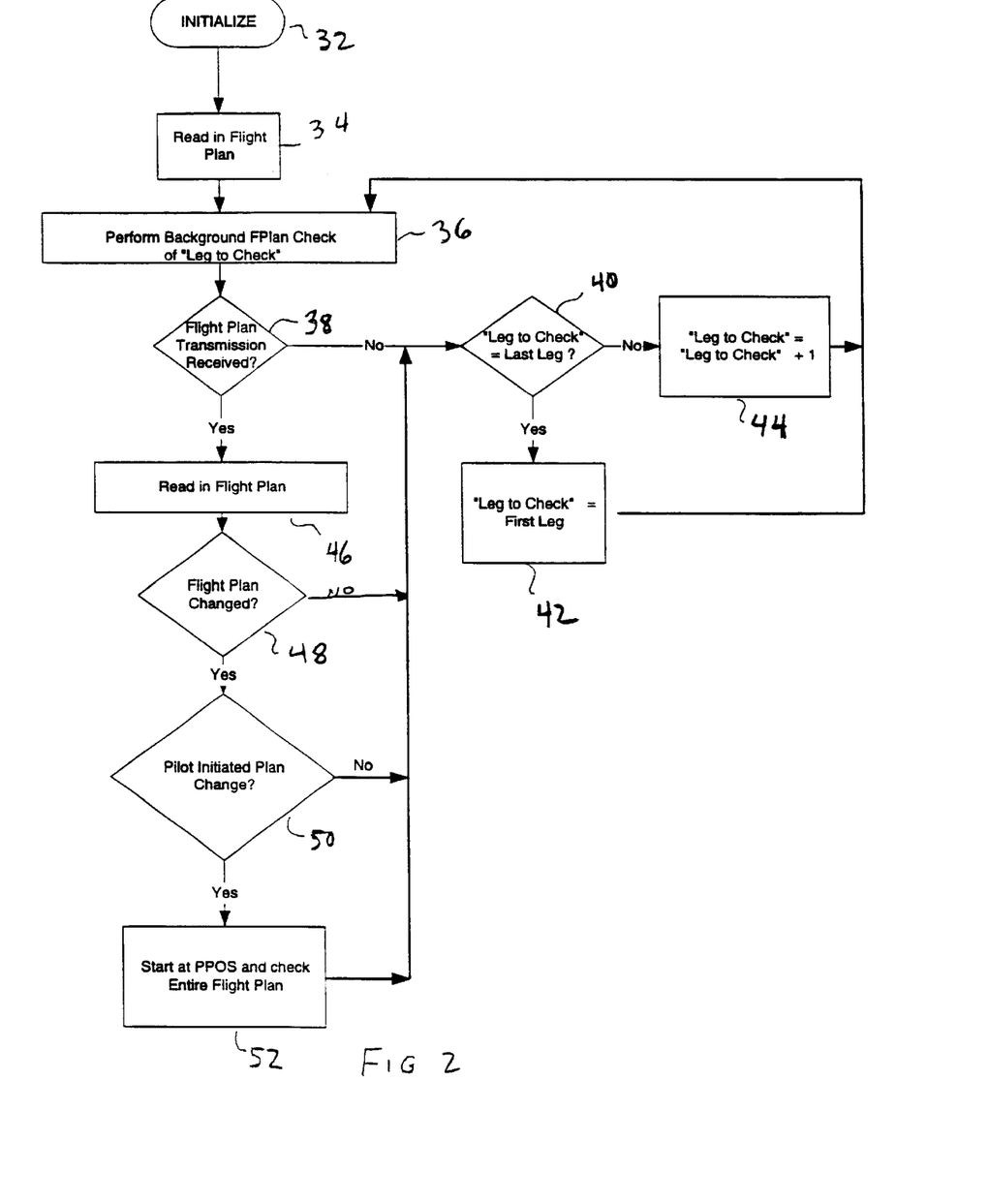
FIG. 2 is a flow diagram of the flight path intent alert software for use in a flight path intent alert system.
Figure 3:
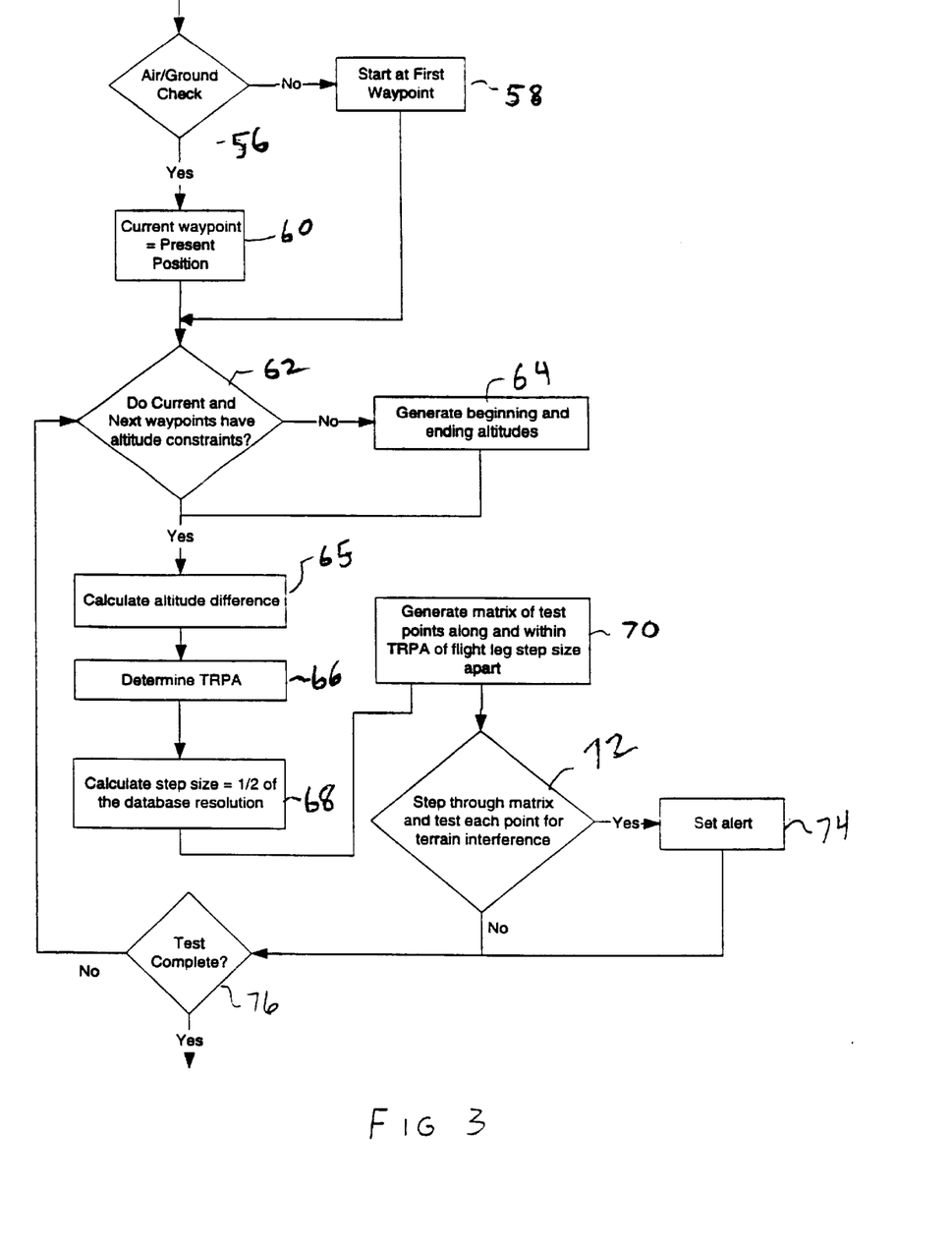
FIG. 3 is a flow diagram further defining the function of the software described by the flow diagram of FIG. 2.

Referring next to FIGS. 1 and 2, when the flight plan intent alert system 10 is activated, it first performs the step of initialization 32. In this step 32, any necessary data and program portions which must be loaded into working memory 22 are so loaded, variables are set to preselected values as required, and program execution is commenced. Program execution continues with the step 34, in which the flight plan data and other associated data required by the flight plan intent alert system 12 is output by the flight management system 16, and received and saved in working memory 22. This data is then used in the next step 36 in which the current leg of the flight path, which extends between two sequential waypoints, is checked for flight plan intent alert conditions. If program operation has just commenced, the variable representing the first leg will be set to a value indicating the first leg, and the current leg will be the leg between the first and second waypoints for which flight plan information has been received from the flight management system 12. FIG. 3 is a flow diagram describing the procedure for determining the presence or absence of flight plan intent alert conditions in a leg of the flight plan, and this procedure will be discussed in greater detail below in connection with FIG. 3. If the flight plan intent alert system 10 is a portion of another system, the determination of alert conditions may be made in the background between execution of other programs or program portions.

After the determination of the flight plan intent alert condition has been completed, the program continues with the step 38 of determining if a flight plan transmission has been received from the flight management system 16. If not, the system 10 executes the step 40 to determine whether the last leg of the flight plan has just been checked for alert conditions. If so, the variable which represents the current leg being checked is reset to a value representative of the first leg in this step 42, and program execution will return to checking the first leg as the current leg in the step 36.

If the system 10 determines in the step 40 of checking whether the final leg of the flight plan has just been checked determines that the final leg has not been reached, the program execution moves on to the step 44 of incrementing the variable indicative of the current leg by one, and the system once more executes the step 36 of checking this current leg.

If the results of the step 38 of determining whether a flight plan transmission has been received indicates that it has, then the flight plan data is read into working memory in the next step 46. In order to avoid unnecessary burdening of the system 10, it is not desirable to perform a check of the newly-received flight plan data if no change has been made thereto. Thus, in the next step 48, the flight plan is checked to determine whether it has been changed. If not, program execution will return to the step of checking the current leg through such of steps 40, 42 and 44 as indicated by the program. The determination of the existence of a flight plan change may be made in a variety of ways. First, the newly-received flight plan data could be compared to the prior flight plan data to determine if there are any additions, deletions or modifications. If not, then the new flight plan data would be considered unchanged. Preferably, the flight management system outputs a flag in conjunction with the transmission of the flight plan data indicative of whether the flight plan data is changed. This simplifies the determination of flight plan change of step 48, as it is only necessary to check this flag.

The flight plan information may have changed as a result of aircraft performance or the change may have resulted from additions, deletions or modifications input into the flight management system 16 by the flight crew. Preferably the flight management system 16 outputs a flag in conjunction with the flight plan information which indicates whether a change has resulted from new input by the pilot or other member of the crew. This simplifies the next step 50 of determining whether the change was initiated by the flight crew, as it is only necessary to check the flag indicating such a change.

If the change is determined in step 50 not to have been initiated by the flight crew, then the change may be dealt with by merely checking if the current leg is the last leg in step 40, and either resetting the variable indicative of the current leg to indicate the first leg by the process of step 42 or incrementing the variable indicative of the current leg by one in step 44 and, in either case, returning to the step 36 of checking the current leg for alert conditions.

A change to the flight plan may occur due to operation of the aircraft in various circumstances. Most notably, if the pilot flies the aircraft not to the next waypoint, but rather to the waypoint after that, the flight plan is preferably modified to eliminate the bypassed waypoint. A waypoint is preferably determined to have been flown to if the position of the aircraft crosses a line perpendicular to the line between the flown-to waypoint and the following waypoint which line extends through the flown-to waypoint. While such determinations could be made by the alert system 10, preferably the flight management makes such determinations and automatically modifies the flight plan information accordingly.

If it is determined in step 50 that a pilot or flight crew initiated flight plan change has occurred, continued processing of flight plan data for the next current leg is not desirable. Rather, it is preferable to initiate a complete recheck of the entire flight plan based on the newly changed flight plan information in step 52. Such a recheck can be made according to the procedure described in the flow diagram of FIG. 3. (Also checked on $1^{st}$ pass.) If the aircraft is in the air, such check should commence with the present position and altitude of the aircraft.

Referring now to FIGS. 1 and 3, if only the current leg of the flight plan is to be checked, as provided in step 36 of FIG. 2, then only one pass through the procedure outlined in FIG. 3 will be needed. If the procedure of this FIG. 3 is invoked to perform a complete check of all legs as provided by step 52 of FIG. 2, then multiple iterations of the program will be needed.

The first step 56 of this procedure is the determination of whether the aircraft is in flight or on the ground. Preferably a sensor associated with the landing gear of the aircraft reports weight on or off wheels. Airspeed data from an airspeed sensor could also be used in the step 56 of determining whether the aircraft is in flight or not. Airspeeds below a predetermined value, such as 80 knots, could be used to determine that the aircraft is on the ground. Airspeeds in excess of such predetermined value could be used to indicate that the aircraft is in flight.

If the aircraft is on the ground, then the first waypoint should be considered in step 58 to be the first entered waypoint. If the calculation is being made for the first leg of the flight plan, this will be the leg of the flight plan typically starting at the airport. If the determination is made in step 58 that the aircraft is in flight, however, the first waypoint of the first leg should be set in step 60 to the present position and altitude of the aircraft. This allows the determination of alert conditions to be made dynamically with respect to aircraft position and altitude rather than relying for alert checking on a waypoint that has already been passed. It should be noted that a preferred flight management system will cease to report flight path information for the initial waypoint of legs that have been completed or bypassed. This reduces the number of waypoints remaining in the flight plan, and hence speeds the determinations of alert conditions. Thus, while the aircraft is in flight, the first waypoint of the first leg (the current waypoint) will be defined by aircraft position and altitude rather than by the originally-entered flight plan data for the first waypoint of that leg.

In the next step 62, the flight plan data associated with the first (current) and second (next) waypoints is checked to determine whether useable altitude constraint information is available for both such waypoints. If not, the program execution proceeds to the step 64 where a useable altitude constraint may be generated for the current and/or next waypoints, as required. The altitude constraints may be generated by simply assigning an altitude based on the last useable altitude constraint, by interpolating an altitude constraint from altitude constraints associated with the nearest previous and following waypoints for which such useable altitude constraint information exists. However, in view of the fact that such generated altitude constraints may be inaccurate, it would be unwise to determine alert conditions based thereon.

If useable altitude constraint data is determined to be present for both the current and next waypoints in step 62, the next step 64 is to calculate the difference in altitude constraints. This is accomplished by subtracting the altitude constraint for the current waypoint from that of the next waypoint. If the altitude constraint for the current waypoint is greater than that for the next waypoint, the altitude difference value is reported as a negative number.

In the next step 66, the terrain required position accuracy is determined. If required navigation performance data is transmitted by the flight management system 16 to the flight plan alert system 10 in conjunction with the flight plan data, then this data may be used to determine the terrain required position accuracy. The data may be in the form of a length and can be interpreted as a lateral radius around the desired aircraft position within which the aircraft is required to remain. This is the maximum allowable lateral deviation from the intended flight path as determined from the flight plan information. The intended flight path, for a leg extending between two waypoints for which useable altitude constraint data exists, corresponds to a straight line extending from the latitude and longitude and altitude constraint of the current waypoint to the latitude, longitude and altitude constraint of the next waypoint. The required navigational performance data may also include a vertical tolerance, which may be used to provide an additional margin of safety against proximity of the intended flight path to terrain. The value for the horizontal and vertical (if present) components of required navigational performance may comparatively larger outside the terminal area of fifteen miles from the airport, and may decrease to comparatively smaller values, as desired, with increasing proximity to the airport. For example, the horizontal component of a required navigational performance value for an en route leg might be as great as 1.25 nm, whereas it might be reduced to as little as 300 feet on approach. Likewise, the vertical component may be greater at waypoints in the en route phase of the flight plan.

If required performance data is not available from the flight management system 16, but flight phase information is available, then a terrain required position accuracy value may be assigned based on the phase of flight. Preferably, the terrain required position accuracy for the en route phase of flight would be set to a value such as 0.5 nm. During the terminal phase of flight, that is from six to 15 nm from the airport, the value might be chosen as 0.25 nm, and in the approach/departure phase of flight, within 6 nm of the airport, the terrain required performance accuracy might be chosen as 0.10 nm.

If no flight phase information is available, then a default value or value set may be chosen. The simplest choice would be to use a single terrain required performance accuracy for the entire flight path. In such case it is preferred that the value be comparatively low, such as 0.10 or 0.25 nm in order to avoid nuisance alerts in the terminal and approach/departure areas.

The next step 68 is the calculation of the increment or step size. This may advantageously be accomplished by selecting a value equal to one half of the minimum size of the grid element in the grid in which the current waypoint is located. Thus, for grids with grid element resolutions of 30", equal to about 0.5 nm, an increment or step size of 0.25 nm might be chosen, whereas for areas where the resolution of the grid elements is 6", equal to about 0.10 nm, an increment or step size of 0.05 nm might be chosen.

In the preferred embodiment of the invention the next step 70 is the calculation of a matrix of points which represent the intended flight path with a tolerance equal to the terrain required performance accuracy on either side thereof. While other methods, such as geometric modeling, could be used to approximate the intended flight path, one preferred method for doing so involves the creation of a matrix of test points. The test points are generated by dividing the distance between the current and next waypoint for the present leg of the flight plan by the increment or step calculated in step 68. This gives the total number of increments along the flight path. The incremental altitude difference calculated in step 64 is next divided by the number of increments, including any fraction thereof. This corresponds to the incremental increase or decrease in altitude for each increment of travel along the flight plan. An altitude for each increment along the flight plan can be calculated by adding the incremental altitude to the altitude of the flight plan at the previous increment.

The horizontal component of the terrain required performance accuracy criterion derived from the required navigation performance data, flight phase information or default must also be considered in determining the flight plan alert condition. In step 70, this is most conveniently accomplished by calculating the latitudinal and longitudinal step required to reach a point one increment distant from a point on the flight plan along a line perpendicular to the flight plan at that point. The offset values only need to be calculated once, and can be used repetitively thereafter to generate a test matrix. The number of points required on each side of an increment point along the flight plan is equal to the terrain required position accuracy divided by the increment length with any remainder rounded up to the next integer. Thus, if the increment length is one half the database resolution, which may be 1519 feet, and if the terrain required position accuracy as determined from the required navigational performance were 3500 feet, the number of points to each side will be, as 3500/1519=2.304, when rounded up to the next integer, equals 3.

The step for the outermost point, located at the terrain required position accuracy distance from the associated increment point on the flight plan may be calculated using latitudinal and longitudinal steps which are, in the example 2.304 times larger than the increment steps previously calculated. The next farthest point is two times the latitudinal and longitudinal steps as calculated. The position information may be calculated for the points along one side by adding the latitudinal and longitudinal steps to the latitudinal and longitudinal coordinates of the associated increment point on one side of the flight plan and by subtracting them for points on the other side. The altitude constraint for each such point is the same as the altitude constraint associated with the increment point on the flight path. The process of calculating the latitude and longitude for each increment point along the flight path preferably continues until the complete matrix of points has been calculated for the leg.

In the next step 72, each point in the matrix is compared to terrain data. If the terrain data is presented in a grid, it is merely necessary to locate the grid element into which the calculated latitude and longitude of the point falls. The altitude constraint for the point is then compared to the altitude value for the corresponding grid element. If the altitude constraint, adjusted by any vertical component, is less than or equal to the terrain altitude value associated with the grid element, then an alert condition has been detected. In such case, the next step 74 is the setting of the alert. Preferably, the alert is set by the saving of the latitude, longitude and altitude constraint of the point at which the alert condition occurs. This data may be passed to other programs that perform the alert functions, which may be provided by various means. For example, a program running in parallel with the present program might monitor the alert condition by checking for a non-zero value for the alert data. On detecting such a non-zero value, the program could cause the CPU 12 to output a signal to the flight management system to display the coordinates at which the alert occurred. Similarly, a program could cause the CPU 12 to direct the display and alerting driver 26 to cause a light to be lighted on the flight deck indicative of the existence of the alert condition. Voice alerts, tonal alerts and the like could be produced in like manner.

Once the alert has been set in this step 74, or if no terrain interference was found in the testing of the points in step 72, the next step is determining if the testing is complete. If the testing sequence of FIG. 3 was invoked for the determination of alert conditions for a single leg of the flight plan, then the test should be considered complete in this step 76, and program execution should continue on from step 36 of the program sequence of FIG. 2. If the test sequence of FIG. 3 was invoked for the determination of the entire flight plan starting with the aircraft position, however, the test sequence will continue to proceed stepwise from leg to leg of the intended flight plan until the entire flight plan has been rechecked, at which point the testing sequence will continue on from step 52 of the sequence of FIG. 2.

One form of advantageous method of displaying flight path intent alerts would be via visual presentation of the flight path with associated displays of information and flight path intent alert graphics. One two-dimensional representation of the flight path would be a side view, with the waypoints with useable altitude constraints represented as a series of points or vertical lines indicative by their position from the bottom of the screen, for points, or the extent to which they extend upward from the bottom of the screen, of the altitude constraint at the waypoint. Each leg for which current and next waypoint have useable altitude constraint data might be represented as a line drawn between the points or tops of the lines representative of the waypoints. An alert graphic and/or message could be displayed at any points along such lines at which a flight plan intent alert condition was detected. Lines representative of the intended flight plan would not be extended from or to waypoints for which useable altitude constraint information is not available. Terrain altitude could be indicated across the screen by vertical lines representative of the maximum altitude determined for locations along the flight path and within the horizontal tolerance around it, thus presenting a representation of an approximation of the terrain over which the airplane passes. Alternatively, a curve representative of terrain altitude versus flight plan position could be drawn across the screen and the area under the curve could be filled with a color representative of terrain. The alert graphics would thus be supplemented by a general indication of terrain clearance or lack thereof under the intended flight plan.

An overhead view could likewise be presented. For this view, the intended flight path is preferably displayed for all segments views, irrespective of the presence or absence of useable altitude constraints for the waypoints. The terrain contour may be represented by shading or color changes. Flight path intent alert graphics could be used to identify locations along the intended flight path at which alert conditions have been determined to exist.

Another useful display that could be provided based on the flight plan data is a perspective view in which the waypoints may be illustrated. In the preferred embodiment, the flight plan information generates symbols for each of the waypoints in a three-dimensional perspective view. Preferably, a polygon contouring engine (a computer hardware graphics accelerator engine for video three-dimensional processing) is used. The terrain data is formatted according to the requirements of the contouring engine, and the engine produces the terrain shading, color changes for altitude and contour. In producing the contour, the engine typically receives vertex information for polygons, typically triangles, and these are used to define the surface. As an indication of aircraft altitude relative to the terrain may be obtained from the three-dimensional rendering, only the legs of the flight plan having usable altitude constraints for the current waypoint and next waypoint are connected by a line drawn to indicate the flight path. Terrain alert graphics and text information may be displayed to indicate the location at which any alert conditions have been detected.

For any of the displays, scrolling could be provided so that the flight crew could examine the entire intended flight path without the necessity of scaling the entire intended flight path to fit on the display at one time.

While the invention has been illustrated and described in detail in connection with certain embodiments thereof, it will be appreciated that it is capable of still further modification, and that such modifications may be within the scope of the invention disclosed herein.

We claim:

1. An apparatus for determining flight path alerts, comprising;

a processor coupled to the input module wherein the processor checks for occurrence of the specified condition at intervals along each leg of the flight path;

a database coupled to the processor, the database including terrain information said information inclusive of terrain information for locations along one or more flight paths, said flight path including one or more legs, and wherein the flight path information includes two or more way points, the two or more way points defining a leg, and wherein the processor checks each leg for occurrence of the specified condition;

a memory coupled to the processor, the memory including flight plan information, wherein the flight plan information corresponds to one of the one or more flight paths; and an output device coupled to the processor, the output device providing an alert upon the occurrence or a specified condition, wherein the processor processes the flight information, the terrain information and the flight plan information and generates the alert upon the occurrence of the specified condition.

2. An apparatus for determining flight path alerts, comprising:

a processor coupled to the input module wherein the processor receives flight performance data and generates the maximum allowable horizontal and vertical deviations from the intended flight path;

a database coupled to the processor, the database including terrain information said information inclusive of terrain information for locations along one or more flight paths;

a memory coupled to the processor, the memory including flight plan information, wherein the flight plan information corresponds to one of the one or more flight paths;

a module connected to the processor for receiving flight information and wherein the flight plan information includes information generated based on the flight information; and an output device coupled to the processor, the output device providing an alert upon the occurrence of a specified condition and comprises a display wherein the processor receives the terrain information and generates a flight path display of the intended flight path, and wherein the processor processes the flight information, the terrain information and the flight plan information and generates the alert upon the occurrence of the specified condition.

3. An apparatus for determining flight path alerts, comprising:
- a processor coupled to the input module;
- a database coupled to the processor, the database including terrain information said information inclusive of terrain information for locations along one or more flight paths;
- a memory coupled to the processor, the memory including flight plan information, wherein the flight plan information corresponds to one of the one or more flight paths;
- a module connected to the processor for receiving flight information and wherein the flight plan information includes information generated based on the flight information; and
- an output device coupled to the processor, the output device providing an alert upon the occurrence of a specified condition and comprises a display wherein the processor receives the terrain information and generates a flight path display of the intended flight path, and wherein the processor processes the flight information, the terrain information and the flight plan information and generates the alert upon the occurrence of the specified condition wherein the flight path display further comprises a display of terrain between way points.

4. An apparatus for determining flight path alerts, comprising:
- a processor coupled to the input module;
- a database coupled to the processor, the database including terrain information said information inclusive of terrain information for locations along one or more flight paths;
- a memory coupled to the processor, the memory including flight plan information, wherein the flight plan information corresponds to one of the one or more flight paths;
- a module connected to the processor for receiving flight information and wherein the flight plan information includes information generated based on the flight information; and
- an output device coupled to the processor, the output device providing an alert upon the occurrence of a specified condition and comprises a display wherein the processor receives the terrain information and generates a flight path display of the intended flight path, and wherein the processor processes the flight information, the terrain information and the flight plan information and generates the alert upon the occurrence of the specified condition wherein the flight path display is one of a side view of the flight path and the terrain, a top view of the flight path and the terrain and a perspective view of the flight plan and the terrain.

5. A method of generating flight path intent alerts for an aircraft flight plan comprising the steps of:
- receiving way point location data for at least two way points, the way point data comprising data representative of the location of the way point and altitude data associated with the way point;
- determining a position of at least one intermediate location between the at least two way points;
- retrieving terrain altitude data representative of a terrain altitude associated with the location of each of the at least two way points and the at least one intermediate location;
- determining an aircraft altitude data value for said at least one intermediate location;
- comparing the aircraft altitude data value for the at least two way points and the intermediate location with the corresponding retrieved terrain altitude data; and
- issuing an alert if the aircraft altitude data associated with any of the at least two way points and the intermediate location is indicative of an altitude that is less than the terrain altitude data value for such location.

6. The method of claim 5, wherein the way point location data comprises data representative of the latitude and longitude of a way point, and wherein the terrain altitude data is provided in the terrain altitude database for the location corresponding to the center of a plurality of contiguous, generally quadrilateral areas.

7. The method of claim 5 wherein the terrain altitude data is representative of a highest terrain altitude within the one of a series of areas of terrain containing the location of a way point.

8. The method of claim 7, wherein the at least one intermediate location comprises a plurality of intermediate locations each of which is contained within one of a series of contiguous areas of terrain and wherein the number of such intermediate locations is greater than or equal to the number of contiguous areas of terrain between the at least two way points.

9. The method of claim 5, wherein the step of determining an aircraft altitude data value comprises receiving a signal representative of aircraft altitude.

10. The method of claim 5, wherein the step of determining an aircraft altitude data value for the at least one intermediate location is accomplished by interpolation of the altitude data associated with the at least two way points.

11. The method of claim 5, wherein the step of issuing an alert further comprises:
(i) displaying graphics representative of the terrain between the at least two way points;
(ii) displaying graphics representative of location and altitude data of each of the at least two way points;
(iii) displaying graphics representative of a plurality of intermediate locations and altitude data associated therewith; and
(iv) displaying a warning graphic proximate to any way point or intermediate location for which the altitude data from the terrain database is greater than an actual or projected aircraft altitude.

12. The method of claim 5, further comprising:
- receiving flight performance data, the flight performance data including positional data uncertainty;
- computing a horizontal flight path tolerance based on the flight performance data, wherein the horizontal flight path tolerances defines one or more flight path increments;
- computing a vertical flight tolerance based on the flight performance data;
- checking each of the flight path increments for presence of an aircraft altitude below the terrain altitude data for the increment; and
- displaying allowable horizontal and vertical flight path tolerances.

13. The method of claim 5, further comprising:

receiving an updated flight plan;

determining changes between the updated flight plan and the original flight plan;

recomputing the aircraft altitude data value for way points and intermediate points associated with the updated flight plan using corresponding retrieved terrain altitude data; and issuing an alert if the recomputed aircraft altitude data is indicative of an altitude that is less than the terrain altitude data value for the way points and the intermediate points associated with the updated flight plan.

14. The method of claim 5, wherein the terrain data is included in a terrain data base.

15. A method for issuing alerts for aircraft maintaining a flight plan, comprising:

receiving flight plan information, wherein the flight plan includes one or more legs, each of the one or more legs defined by two way points;

receiving terrain data for geographic locations along the flight plan, wherein the geographic locations include the way points;

determining flight plan information data, wherein the flight plan data comprises aircraft altitude;

in a processor, comparing the flight plan data to the terrain data; and issuing an alert when the comparison indicates the occurrence of a specific event, wherein the specific event comprises an aircraft altitude below an altitude based on the terrain data.

16. The method of claim 14, further comprising determining whether the aircraft in on the ground or in the air.

17. The method of claim 16, wherein when the aircraft is in the air, a current aircraft location comprises a way point, and wherein the aircraft altitude at the current aircraft location is compared to the terrain data.

18. The method of claim 16, wherein when the aircraft is on the ground, the processor compares intended aircraft altitude to the terrain data.

19. The method of claim 14, further comprising:

computing an aircraft altitude tolerance;

computing an aircraft horizontal tolerance; and checking for occurrence of the specified condition within an area defined by the horizontal tolerance, wherein the altitude tolerance and the horizontal tolerance comprise an allowable deviation from an intended flight path.

20. The method of claim 14, wherein the comparison step is performed before flight.

21. The method of claim 14, wherein the comparison step is performed during flight.

22. The method of claim 14, further comprising displaying a graphical representation of the flight path and terrain associated with the flight path.

23. The method of claim 14, wherein the flight path comprises one or more legs, further comprising:

defining one or more increments for each of the legs; and comparing the aircraft data to the terrain data at each of the one or more increments.

24. An apparatus that generates alerts related to an aircraft flight plan, comprising:

an input that receives flight information;

a database that stores terrain information related to the aircraft flight plan, wherein the terrain data includes terrain altitude data; and a processor that processes the flight information to generate a flight plan for comparison with the terrain information, wherein the flight plan includes one or more legs, each of the one or more legs defined by at least two way points, wherein a way point includes one or more of a fixed geographical location and a current location of the aircraft, and wherein the processor further compares the processed flight information to the terrain information to determine the occurrence of a specified event, and generates an alert upon the occurrence of the specified event.

25. The apparatus of claim 24, wherein the current location of the aircraft includes one of on the ground and in the air.

26. The apparatus of claim 24, wherein the processor divides each leg into one or more increments, and computes an altitude constraint for each way point and for each increment, based on the terrain altitude data.

27. The apparatus of claim 26, wherein the terrain altitude data for a way point is estimated, based on data at a prior and a subsequent way point.

28. The apparatus of claim 24, wherein the flight information includes aircraft position information and aircraft altitude information, and wherein the position information includes aircraft latitude and longitude.

29. The apparatus of claim 28, wherein the specific event includes the aircraft altitude at a value less than an altitude constraint at a way point or at an increment.

30. The apparatus of claim 21, wherein the flight information is provided by one or more of a flight management system and aircraft instruments.

31. A method of generating flight path intent alerts for an aircraft flight plan, comprising:

receiving geographic data related to an aircraft flight plan;

receiving terrain altitude data representative of a terrain altitude associated with two or more points in the aircraft flight plan;

determining an aircraft geographic location and an aircraft altitude data value corresponding to the aircraft geographic location;

comparing the aircraft altitude data value for the at least the two or more points with the corresponding retrieved terrain altitude data; and issuing an alert if the aircraft altitude data associated with any of the at least two or more points indicates an altitude that is less than the terrain altitude data value for the aircraft geographic location.

32. The method of claim 26, wherein the aircraft geographic location is a projected future location, and wherein a current aircraft location is on the ground.

33. The method of claim 26, wherein the aircraft location is an actual aircraft location, the actual aircraft location being in the air.

34. The method of claim 26, further comprising:

receiving aircraft information indicating an updated flight plan;

comparing the update flight plan to terrain data; and issuing an alert if aircraft altitude associated with the updated flight plan indicates an altitude that is less than the terrain altitude data value for the aircraft geographic location.

35. An apparatus for determining flight plan alerts, wherein a flight plan includes one or more legs, each leg extending between a way point and a successive way point comprising:

a processor coupled to the input module;

a database coupled to the processor, the database including terrain information said information inclusive of terrain information for locations along said flight plan;

a memory coupled to the processor, the memory including flight plan information, wherein the flight plan information corresponds to one of the one or more legs of the flight plan; and an output device coupled to the processor, the output device providing an alert upon the occurrence of a specified condition, wherein the processor processes the flight information, the terrain information and the flight plan information and generates the alert upon the occurrence of the specified condition.

36. The apparatus of claim 35 further comprising a module connected to the processor for receiving flight information and wherein the flight information is provided by one or more of a flight management system and aircraft sensors.

37. The apparatus of claim 36, wherein the flight information includes aircraft altitude, latitude and longitude.

38. The apparatus of claim 35 further comprising a module connected to the processor for receiving flight information and wherein the flight plan information includes information generated based on the flight information.

39. The apparatus of claim 35, wherein a flight plan includes one or more legs, wherein the flight plan information includes two or more way points, the two or more way points defining a leg, and wherein the processor checks each leg for occurrence of the specified condition.

40. The apparatus of claim 39, wherein a way point is defined as one or more of a fixed geographical location and a current aircraft location, the current aircraft location including one of on the ground and in the air.

41. The apparatus of claim 39, wherein the specified condition comprises a minimum altitude, wherein each of the two or more way points comprises terrain information including altitude information and wherein each way point includes an altitude constraint corresponding to the minimum altitude.

42. The apparatus of claim 39, wherein the specified condition comprises a minimum altitude, wherein one or more way points does not include an altitude constraint, and wherein the processor determines an altitude constraint based on one or more of a prior altitude constraint and an interpolation of a prior altitude constraint and a future altitude constraint.

43. The apparatus of claim 39, wherein the processor checks for occurrence of the specified condition at intervals along each leg of the flight plan.

44. The apparatus of claim 35, wherein the output device comprises a display and wherein the processor displays at least a portion of the flight plan.

45. The apparatus of claim 41, wherein the processor receives flight performance data and generates maximum allowable horizontal and vertical deviations from the flight plan based thereon.

46. The apparatus of claim 44, wherein the flight path display further comprises a display of terrain between way points, said flight path display being one of a side view of the flight path and the terrain, a top view of the flight path and the terrain and a perspective view of the flight path and the terrain.

47. The apparatus of claim 35, wherein the terrain data includes latitude and longitude data, and altitude data representative of the maximum altitude within a geographic area surrounding a latitude and longitude whose data are included in the terrain data.

48. The apparatus of claim 35, wherein the alert is provided as one or more of a text alert, an audible alert, including a tone or a voice alert, a light signal, and an image.

49. A method of generating flight plan alerts for an aircraft flight plan comprising the steps of:

receiving way point location data for at least two way points, the way point data comprising data representative of the location of the way point and altitude data associated with the way point;

determining a position of at least one intermediate location between the at least two way points;

retrieving terrain altitude data representative of a terrain altitude associated with the location of each of the at least two way points and the at least one intermediate location;

determining a flight plan altitude data value for said at least one intermediate location;

comparing the flight plan altitude data value for the at least two way points and the intermediate location with the corresponding retrieved terrain altitude data; and issuing an alert if the flight plan altitude data associated with any of the at least two way points and the intermediate location is indicative of an altitude that is less than the sum of a vertical tolerance and the terrain altitude data value for such location.

50. The method of claim 49, wherein the way point location data comprises data representative of the latitude and longitude of a way point, and wherein the terrain altitude data is provided in the terrain altitude database for each of the locations.

51. The method of claim 50, wherein the at least one intermediate location comprises a plurality of intermediate locations each of which is contained within one of a series of contiguous areas of terrain and wherein the number of such intermediate locations is greater than or equal to the number of contiguous areas of terrain between the at least two way points.

52. The method of claim 49, wherein one of said waypoints is the location of the aircraft, and wherein the flight plan altitude data value is based on aircraft altitude.

53. The method of claim 49 wherein the step of determining a flight plan altitude data value for the at least one intermediate location is accomplished by interpolation of the altitude data associated with the at least two way points.

54. The method of claim 49, wherein the step of issuing an alert further comprises:

displaying graphics representative of the terrain between the at least two way points;

displaying graphics representative of location and altitude data of each of the at least two way points;

displaying graphics representative of a plurality of intermediate locations and altitude data associated therewith; and displaying a warning graphic proximate to any way point or intermediate location for which the altitude data is less than the terrain database exceeds a threshold value calculated based on the flight plan altitude.

55. The method of claim 49 further comprising:

receiving flight performance data, the flight performance data including positional data uncertainty;

computing a horizontal flight plan tolerance based on the flight performance data, wherein the horizontal flight plan tolerances defines one or more flight path increments;

computing a vertical flight tolerance based on the flight performance data;

checking each of the flight plan increments for presence of a flight plan altitude within the vertical flight tolerance of the terrain altitude data for the increment; and displaying allowable horizontal and vertical flight path tolerances.

56. The method of claim 49, further comprising:

receiving an updated flight plan;

determining changes between the updated flight plan and the original flight plan;

recomputing the aircraft altitude data value for way points and intermediate points associated with the updated flight plan using corresponding retrieved terrain altitude data; and issuing an alert if the recomputed aircraft altitude data is indicative of an altitude that is less than the terrain altitude data value for the way points and the intermediate points associated with the updated flight plan.

* * * * *